(12) United States Patent
Drake et al.

(10) Patent No.: US 10,771,151 B2
(45) Date of Patent: Sep. 8, 2020

(54) OUTSIDE PLANT FIBER HEALTH MONITORING SYSTEM

(71) Applicant: Level 3 Communications, LLC, Broomfield, CO (US)

(72) Inventors: Steven E. Drake, Thornton, CO (US); Charles R. Lyman, Longmont, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 16/050,608

(22) Filed: Jul. 31, 2018

(65) Prior Publication Data
US 2019/0036599 A1 Jan. 31, 2019

Related U.S. Application Data

(60) Provisional application No. 62/539,332, filed on Jul. 31, 2017.

(51) Int. Cl.
| | |
|---|---|
| *H04B 10/07* | (2013.01) |
| *H04B 10/077* | (2013.01) |
| *G02B 6/44* | (2006.01) |
| *G01M 11/00* | (2006.01) |
| *H04J 14/00* | (2006.01) |

(52) U.S. Cl.
CPC ......... *H04B 10/0775* (2013.01); *G01M 11/33* (2013.01); *G02B 6/4467* (2013.01); *H04B 10/077* (2013.01); *H04B 10/0773* (2013.01); *H04B 10/07* (2013.01); *H04J 14/00* (2013.01)

(58) Field of Classification Search
CPC ............ H04B 10/0775; H04B 10/0773; H04B 10/077; H04B 10/07; G01M 11/33; G02B 6/4467; H04J 14/00
USPC ......................................... 398/9–38, 43–103
See application file for complete search history.

(56) References Cited

U.S. PATENT DOCUMENTS

| | | | | |
|---|---|---|---|---|
| 6,005,696 A | * | 12/1999 | Joline | H04B 10/07 370/241 |
| 6,292,464 B1 | * | 9/2001 | Elahmadi | H04B 10/032 370/223 |
| 6,317,231 B1 | * | 11/2001 | Al-Salameh | H04B 10/077 398/14 |
| 6,862,380 B2 | * | 3/2005 | Chaudhuri | H04J 14/0206 385/17 |
| 6,917,763 B1 | * | 7/2005 | Au | H04B 10/0771 398/13 |
| 6,980,737 B1 | * | 12/2005 | Anslow | H04B 10/07953 375/224 |

(Continued)

*Primary Examiner* — Dibson J Sanchez

(57) ABSTRACT

A system for monitoring health of a fiber optic cable in a telecommunications system includes an optical switch for receiving a plurality of light noise signals over the fiber optic cable and measuring the intensity of at least one of the plurality of light noise signals. The measured intensity data is transmitted to a monitoring system that then compares the measured intensity to a stored threshold intensity value. The system may also include a light signal generator for providing the plurality of light noise signals. The light signal generator may include a first amplifier for generating a light noise signal, a second amplifier for generating a corresponding amplified light noise signal, and an optical splitter for converting the amplified light noise signal into the plurality of light noise signals.

16 Claims, 4 Drawing Sheets

(56) References Cited

U.S. PATENT DOCUMENTS

| | | | | |
|---|---|---|---|---|
| H2190 H | * | 6/2007 | Chen | H04B 10/25 375/353 |
| 7,254,327 B1 | * | 8/2007 | Zhong | H04B 10/0775 398/33 |
| 7,711,267 B2 | * | 5/2010 | Wellbrock | H04L 43/0811 398/33 |
| 8,180,216 B2 | * | 5/2012 | Xia | H04J 3/0682 398/25 |
| 9,680,569 B2 | * | 6/2017 | Archambault | H04J 14/0212 |
| 9,838,113 B2 | * | 12/2017 | Ejima | H04B 10/0795 |
| 9,900,089 B2 | * | 2/2018 | Yuki | H04B 10/07955 |
| 10,608,774 B2 | * | 3/2020 | Tse | H04Q 11/0005 |
| 2002/0041409 A1 | * | 4/2002 | Laham | H04Q 11/0005 398/12 |
| 2002/0149815 A1 | * | 10/2002 | Schafer | H04Q 11/0005 398/56 |
| 2003/0026528 A1 | * | 2/2003 | Kimotsuki | G02B 6/12026 385/24 |
| 2004/0096216 A1 | * | 5/2004 | Ito | H04B 10/0775 398/33 |
| 2004/0101233 A1 | * | 5/2004 | Lee | G02B 6/359 385/16 |
| 2004/0223759 A1 | * | 11/2004 | Fee | H04B 10/079 398/33 |
| 2005/0093582 A1 | * | 5/2005 | Bock | H03G 1/0023 327/77 |
| 2006/0051093 A1 | * | 3/2006 | Manna | H04B 10/296 398/79 |
| 2006/0147162 A1 | * | 7/2006 | Ekkizogloy | H04B 10/40 385/92 |
| 2006/0159460 A1 | * | 7/2006 | Stewart | H04B 10/07955 398/135 |
| 2007/0280684 A1 | * | 12/2007 | Onoda | H04B 10/03 398/38 |
| 2008/0232760 A1 | * | 9/2008 | Xia | H04B 10/0775 385/140 |
| 2008/0310858 A1 | * | 12/2008 | Lu | H04B 10/296 398/158 |
| 2009/0080881 A1 | * | 3/2009 | Yokoyama | H04J 14/0227 398/16 |
| 2010/0253936 A1 | * | 10/2010 | Xia | G01M 11/333 356/73.1 |
| 2010/0266275 A1 | * | 10/2010 | Xia | H04B 10/0773 398/16 |
| 2010/0272431 A1 | * | 10/2010 | Chen | H04B 10/07951 398/16 |
| 2011/0142439 A1 | * | 6/2011 | Chen | H04B 10/0775 398/16 |
| 2011/0142440 A1 | * | 6/2011 | Xia | H04B 10/0775 398/16 |
| 2011/0222851 A1 | * | 9/2011 | Berg | H04J 14/0212 398/48 |
| 2011/0229128 A1 | * | 9/2011 | Sakamoto | H04B 10/0775 398/29 |
| 2012/0224170 A1 | * | 9/2012 | Hisamoto | H04B 10/077 356/73.1 |
| 2012/0321296 A1 | * | 12/2012 | Wellbrock | H04J 14/021 398/5 |
| 2013/0084064 A1 | * | 4/2013 | Akasaka | H04B 10/0795 398/34 |
| 2013/0195462 A1 | * | 8/2013 | Ghioni | H04J 14/0212 398/83 |
| 2013/0315579 A1 | * | 11/2013 | Xia | H04Q 11/0001 398/5 |
| 2014/0112658 A1 | * | 4/2014 | Hurley | H04B 10/0731 398/28 |
| 2014/0328586 A1 | * | 11/2014 | He | H04B 10/07953 398/26 |
| 2014/0348464 A1 | * | 11/2014 | Kamura | H04B 10/0775 385/16 |
| 2014/0355981 A1 | * | 12/2014 | Miyazaki | H04J 14/0221 398/38 |
| 2015/0155935 A1 | * | 6/2015 | Oda | H04B 10/07953 398/26 |
| 2015/0208146 A1 | * | 7/2015 | Younce | H04Q 11/0066 398/21 |
| 2015/0381272 A1 | * | 12/2015 | Nakamura | H04B 10/0775 398/16 |
| 2016/0173202 A1 | * | 6/2016 | Kelly | H04B 10/506 398/34 |
| 2016/0315701 A1 | * | 10/2016 | Yuki | H04J 14/0221 |
| 2017/0099099 A1 | * | 4/2017 | Papakos | H04J 14/021 |
| 2017/0279528 A1 | * | 9/2017 | Huang | H04B 10/548 |
| 2017/0279593 A1 | * | 9/2017 | Mittal | H04B 10/691 |
| 2018/0034544 A1 | * | 2/2018 | Satou | H04J 14/00 |
| 2018/0212707 A1 | * | 7/2018 | Yamamoto | H04B 10/032 |
| 2018/0269964 A1 | * | 9/2018 | Mertz | H04B 10/07955 |
| 2019/0052356 A1 | * | 2/2019 | Inoue | H01S 3/1301 |
| 2019/0253139 A1 | * | 8/2019 | Satou | H04J 14/02 |

* cited by examiner

OUTSIDE PLANT FIBER HEALTH MONITORING SYSTEM

CROSS-REFERENCE TO RELATED APPLICATIONS

This application is related to and claims priority under 35 U.S.C. § 119(e) from U.S. Patent Application No. 62/539,332, filed Jul. 31, 2017, titled "OUTSIDE PLANT FIBER HEALTH MONITORING SYSTEM," the entire content of which is incorporated herein by reference for all purposes.

TECHNICAL FIELD

Embodiments of the present invention generally relate to systems and methods for implementing a telecommunications network and more specifically for monitoring the health or capability of fiber optic transmission lines utilized in a telecommunications network.

BACKGROUND

Telecommunication networks provide for the transmission of information such as voice, data or multimedia information, among others. In addition, telecommunication networks often offer features and/or services to the customers of the network that provide flexible and varied ways in which the communications are transmitted over the network. For example, some telecommunication networks provide Internet access, long distance communication capabilities between communication devices, high definition audio and/or video communication capabilities, and the like.

In many instances, communication packets of a telecommunications network are transmitted along transmission paths or lines. For example, the telecommunications network may include coaxial cables, Ethernet cables, twisted pair cables, and the like to transmit communication packets and data between components of the telecommunications network or connected to the network. In some instances, the telecommunications network may include fiber optic cables to carry the communications. These cables physically connect one component of the network to another such that information or data sent from one component of the network arrives at the other component. As should be appreciated, the telecommunications network may include any number of such transmission lines or cables to carry the various packets of the network that facilitate the exchange of communications.

SUMMARY

In a first aspect of the present disclosure, a method of monitoring a fiber optic cable is provided. The method includes receiving a plurality of light noise signals over the fiber optic cable at an optical switch coupled to the fiber optic cable and measuring, using the optical switch, the intensity of at least one of the plurality of light noise signals. The method further includes comparing, using a monitoring system communicatively coupled to the optical switch, the intensity of the at least one of the plurality of light noise signals to a stored threshold intensity value. In certain implementations the method may further include generating the plurality of light noise signals using a light signal generator. The light signal generator may include circuitry adapted to produce an amplified light noise signal and split the amplified light noise signal into the plurality of light noise signals on the fiber optic cable. The stored threshold intensity value may be based on a previous intensity measurement obtained by measuring the intensity of a plurality of previous light noise signals received over the fiber optic cable.

In another aspect of the present disclosure, a system for monitoring a fiber optic cable is provided. The system includes an optical switch located at a first site of a telecommunications network that is configured to receive at least one of a plurality of light noise signals transmitted on an outside plant fiber optic cable from a second, remote site. The optical switch is further configured to measure the intensity of the received light noise signal and to transmit the intensity measurement to a monitoring system of the system. The monitoring system is configured to then compare the intensity measurement to a stored threshold intensity value and, in certain implementations, to issue an alert or similar signal to a remote computing device. The system may further include a light generator configured to produce and transmit the plurality of light noise signals to the optical switch.

In still another aspect of the present disclosure, another system is provided that includes a light signal generator at a first site of a telecommunications network. The light signal generator is configured to output a plurality of light noise signals over a fiber optic cable to a second, remote site of the telecommunications network. The light signal generator generally includes an amplifier circuit that produces an amplified light noise signal and an optical splitter configured to receive the amplified light noise signal and split the amplified light noise signal into the plurality of light noise signals. In certain implementations, the amplifier circuit includes a first amplifier for producing a light noise signal that is then received and amplified by a second amplifier, thereby producing the amplified light noise signal provided to the optical splitter. In one example implementation, the first is an amplified spontaneous emission (ASE) generator that produces one or both of a C-band or an L-band light noise signal.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

Each of the different types of transmission lines of a telecommunications network may employ a particular type of transmission media. For example, coaxial cables utilize electrical impulses to carry or transmit the data along the cables. Fiber optic cables, on the other hand, utilize light to transmit the data through the cable. By using light as a transmission medium, fiber optic cables can typically carry more information at a faster rate than other types of cables. As such, many telecommunications networks use fiber optic cables to transmit information between network sites over long distances. These cables are often referred to as "outside plant" fiber cables. In many instances, many outside plant fiber cables are spliced together in a line to create the transmission cable over several miles between network sites.

Figure 1:
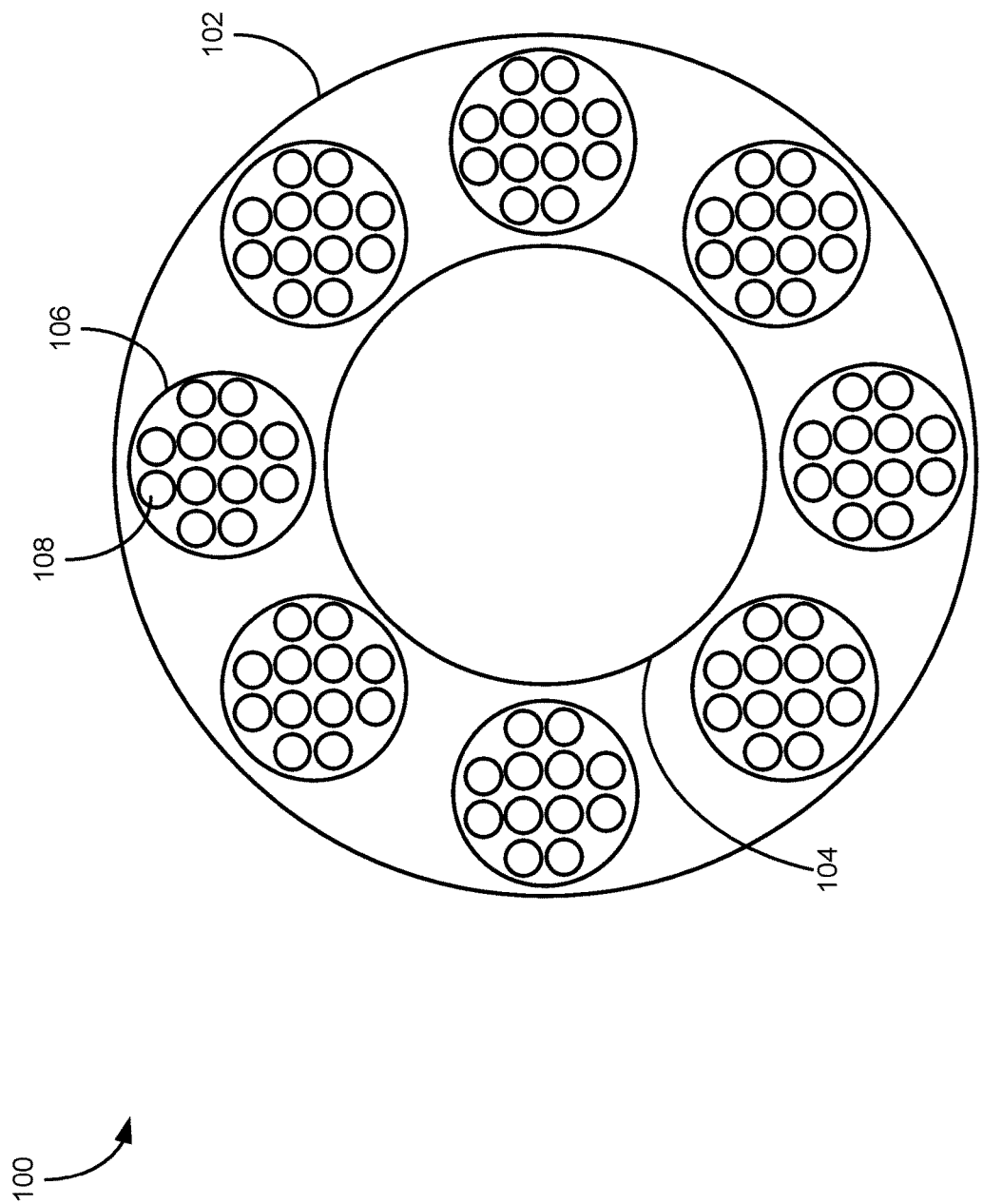
FIG. 1 schematic diagram illustrating a cross-section of an example outside plant fiber cable for transmitting telecommunication communications.

FIG. 1 is a schematic diagram illustrating a cross-section of an example outside plant fiber optic cable 100 for transmitting telecommunication packets or data. It should be appreciated, however, that the fiber optic cable 100 of FIG. 1 is one example of a fiber optic cable and other embodiments of the present disclosure may utilize other types of cables with more or fewer fibers. In the embodiment shown in FIG. 1, multiple fibers are included in the fiber optic cable, bundled together in one or more buffer tubes 106. For example, the cable 100 of FIG. 1 includes eight buffer tubes, with each tube carrying twelve fibers 108 for transmission of telecommunication data. Thus, the example cable 100 includes 96 fibers. The buffer tubes 106 surround a guide wire 104 disposed down the center of the cable 100. The guide wire 104 is typically of a rigid or semi-rigid construction (such as steel or other hard metal substance) to provide rigidity to the fiber optic cable 100 to prevent damage to the fibers 108. The fiber optic cable 100 is then typically buried underground between telecommunication sites, with access panels provided in the ground to access the cable. At each site that is connected by the fiber optic cable 100, each fiber of the cable is connected to a component within the site that facilitates the transmission of light pulses or other signals along the fibers of the cable for communication between the sites.

Upon installation or laying of the fiber optic cable 100 between the sites, the integrity of the fibers 108 may be tested and verified. Problems or breaks in the fibers may then be detected and fixed. However, it is often the case that telecommunication companies assume that the fibers 108 remain intact from that point forward. Problems or breaks in the fibers 108 that occur after laying of the cable 100 may not be detected until the broken or damaged fiber is activated to carry traffic. Once detected, the damaged fiber 108 may be repaired or traffic may be routed to a different fiber, however, each of these may cause a delay in the activating of traffic for a customer to the network, providing inefficiency in the operation of the network.

Damage to fiber optic cables 100 may occur for a variety of reasons. For example, construction equipment near an installed cable may not be aware of the presence of the cable and may damage one or more fibers 108 within a buffer tube 106 and may sometimes sever the entire cable 100. Other damage may occur through weather (such as the expansion and contraction of the cable through heat and cold), natural disasters (such as earthquakes or floods), animals, malicious tampering, and the like. Telecommunications networks may monitor traffic carried on a fiber 108 of the cable 100 and assume that proper operation of one fiber indicates that all of the fibers in the cable are fully operational. However, small breakages, nicks, or other damage may occur on only some fibers 108 of the cable 100 that are only detected when the fiber is activated. Thus, monitoring of each fiber 108 in the cable 100 may improve the efficiency and operation of a telecommunications network.

Figure 2:
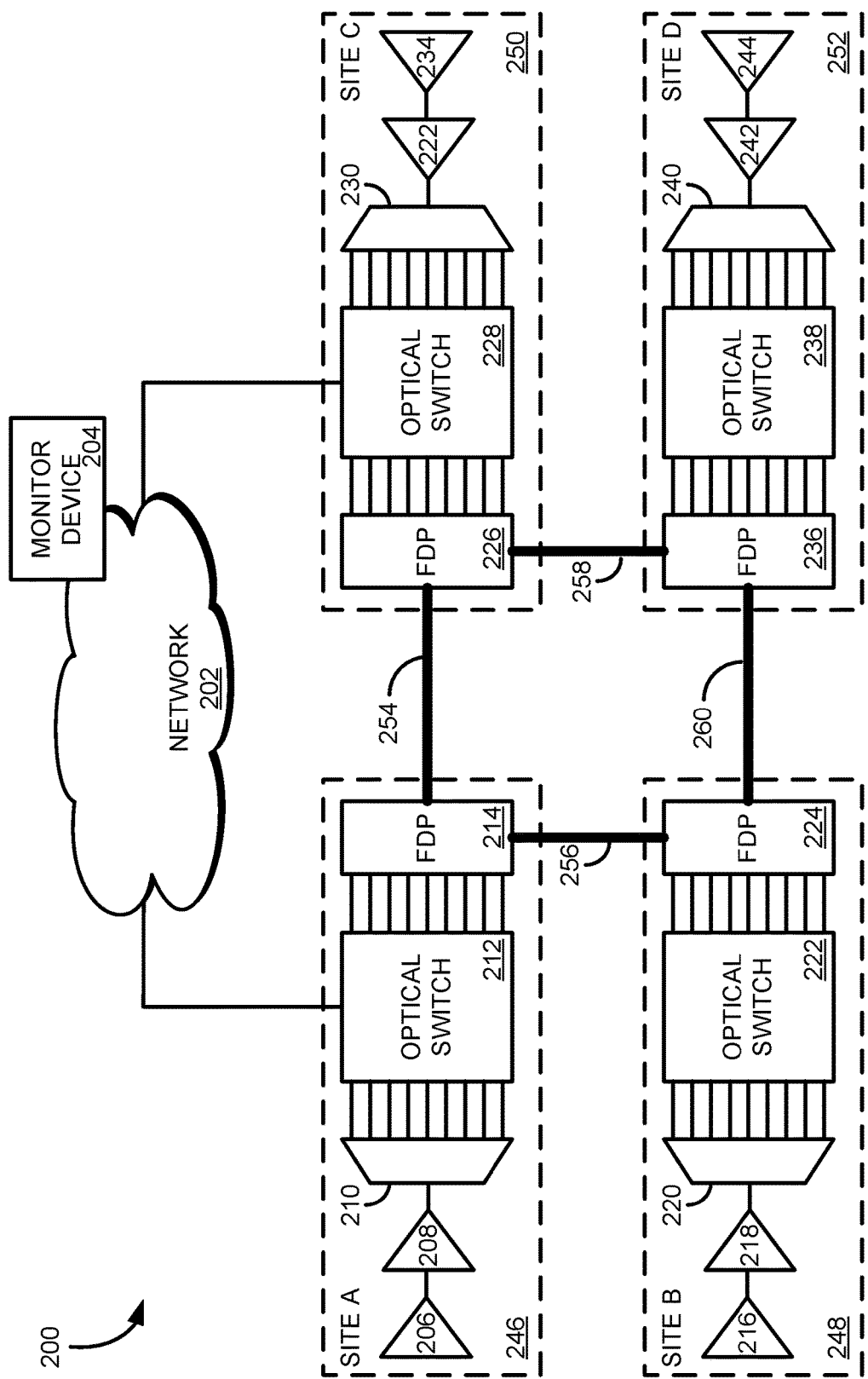
FIG. 2 is a schematic diagram illustrating an outside plant fiber cable health monitoring system for a telecommunications network.

FIG. 2 is a schematic diagram illustrating an outside plant fiber optic cable health monitoring system 200 for a telecommunications network. The system 200 may be used in part with a telecommunications network to monitor and report on a measured performance or "health" of one or more fiber optic connections between sites of the network. Through the system 200, a real-time monitoring of the fibers of the network may be obtained, regardless of whether the fibers are carrying transmissions or traffic. Detected problems or breakages within the fiber cables may then be remedied prior to providing traffic on the fibers, thereby improving the commissioning of traffic on the fiber cables.

In the system 200 of FIG. 2, four telecommunication sites are shown, namely site A 246, site B 248, site C 250, and site D 252. Although four sites are illustrated, it should be appreciated that any number of sites of the network may include the components of the system discussed below. The sites 246-252 of the network are typically geographically disparate and may be separated by various distances up to and including several miles. Each of the sites 246-252 are connected to other sites through outside plant fiber optic cables. For example, site A 246 is connected to site C 250 through fiber optic cable 254. Thus, fiber optic cable 254 may include several fibers along which communications may be transmitted between site A 246 and site C 250. In a similar manner, fiber optic cable 256 may connect site A 246 and site B 248, fiber optic cable 260 may connect site B 248 and site D 252, and fiber optic cable 258 may connect site D 252 and site C 250. More or fewer outside plant fiber optic cables may be included between sites of the network, although the fiber optic cables 254-260 of FIG. 2 are included for simplicity in describing the system 200.

Each fiber optic cable 254-260 is terminated at either end at a connecting site through a fiber distribution panel (FDP). For example, cable 254 and cable 256 terminate on one end at FDP 214 of site A 246. Site B includes FDP 224 that terminates the other end of cable 256 and sites C 250 includes FDP 226 that terminates the other end of cable 254. In general, the FDP of a site (such as FDP 214 of site A 246) provides a communication port for each fiber 254, 256 connected to the site. In some instances, a site 246 may include multiple FDPs, although only a single FDP is shown per site in the system 200 for clarity. Assuming that each cable 254-260 of the system 200 has the same number of fibers as the fiber cable 100 discussed above, each FDP may include 192 ports, 96 for cable 254 and 96 for cable 256. Again, however, the network may include any number of fiber connections and any number of ports in the FDP to service those fiber connections. For simplicity, the foregoing description of site equipment was described with reference to site A 246 only. It should be appreciated that the other sites of the system 200 may be substantially similar to site A 246 and that the foregoing description may be similarly applied to the equipment at such other sites.

As shown in the system 200 of FIG. 2, each site 246-252 includes the same types of components connected in the same or similar manner. It should be appreciated that the configuration of the components of the sites may differ from other sites in the network. However, for simplicity, the components are illustrated as being the same or similar. Further, because each site 246-252 has two cables connected to the respective FDP, each FDP may include 192 ports, as explained above. Other configurations may include more or fewer ports.

As should also be appreciated, fibers of a fiber optic cable 254 are often configured to transmit information in one direction. Thus, some of the fibers of cable 254 may transmit data or packets from site A 246 to site C 250, while other fibers within the cable may transmit data or packets in the opposite direction from site C 250 to site A 246. Even fibers within a particular buffer tube may transmit one direction while others in the same buffer tube may transmit in the other direction. As such, the ports of the FDP 214 may be configured to either transmit data or receive data from the connected cables 254, 256, depending on a configuration of the network devices and desires of engineers or designers of the network.

Using site A 246 as an example site, the site may include other components that provide real-time monitoring of each of the fibers in a cable 254, 256 connected to the site. In particular, the site 246 may include an optical switch 212 that connects to the site FDP 214. Each port of the switch 212 connects to a port of the FDP in a one-to-one relationship. In general, the switch 212 allows for packets or communications received at the FDP 214 from the connected cables 254, 256 to be routed within the site. Thus, although not illustrated, other site networking components may connect to the optical switch 212 to receive incoming packets or transmit packets to other sites of the network. However, in many cases, the fibers of the cables 254, 256, do not carry traffic but are provided for future use or expansion of the network capacity.

In one particular embodiment, the switch 212 may include the capability of measuring the intensity of incoming light signals from the FDP 214. As mentioned above, some fibers of the cables 254, 256 connected to the FDP 214 may carry and provide light signals to the FDP from other sites 248, 250 of the network. These light signals may carry the data and packets for communications within the network. The FDP 214 provides the incoming light signals from the fibers to the switch 212. In some implementations, the switch 214 measures an intensity of the received light signals at each incoming port and, in some cases, provides the measured intensity to a monitoring system, described in more detail below.

To provide a test signal to transmit along the outside plant fibers connected to a site 246, each site may include a pair of amplifier components 206, 208 and a splitter 210 component. In one particular embodiment, a first amplifier 206 may be an amplified spontaneous emission (ASE) generator. In general, the ASE generator provides an amplified optical noise signal, typically within the C-band range (light with a wavelength range of 1530 nanometers (nm) to 1565 nm). The output of the ASE generator signal is provided to a second amplifier 208 to boost the signal to about 3 decibels measured referenced to one milliwatt (dBm). In other implementations, the second amplifies 208 may instead be configured to boost the signal to other levels that are below or exceed 3 cBm. Although described as including an ASE generator and a signal amplifier, the site 246 may include any type of amplified signal producing components to create and transmit an optical signal along one or more of the fibers of connected outside plant fiber cables.

In the described embodiment, the amplified C-band signal from the second amplifier 208 is then provided to a splitter component 210 that splits the optical signal into several signals provided as inputs to the switch 212. In one embodiment, the splitter 210 is a dense wavelength division multiplexing (DWDM)-type splitter that splits the C-band signal into discrete frequencies across the C-band. In another embodiment, the splitter 210 is an optical splitter that splits the light signal across multiple outputs. Regardless of the type of splitter 210 used, the input from the amplifiers 208 is split and provided to the switch 212. In one embodiment, the light may be split such that each port of the switch 212 receives an input signal (even if the port is configured to not receive or accept the input signal as other network components are utilizing that particular port). In other embodiments, only those ports of the switch 212 that are unconnected to another site component and are an egress port from the site may receive the input signal from the splitter.

Through the components at each site 246-252, a real-time continual monitoring of the fibers of the outside plant fiber cables 254-260 may occur within the network. For example, to monitor the fiber optic of cable 254 that carry traffic from site A 246 to site C 250, a monitoring signal may be transmitted on those fibers and measured at site C. In particular, amplifier 206 may generate a light signal that is amplified by amplifier 208. The amplified light signal is split by splitter 210 and provided to switch 212. Switch 212 provides the received light signals on one or more outgoing ports of FDP 214 and across those outgoing fibers of cable 254. At site C 250, the light signals are received at FDP 226 as incoming signals, which are passed along to switch 228. As described above, switch 228 may measure the intensity of received light signals and provide an indication of the measured light intensity of the received signals. In this manner, site A 246 may provide a test signal on fibers of the cable 254 that are measured at site C 250. As described in more detail below, these measured received signals may be used by the system 200 to determine damage or transmission issues that occur on the fibers of the cable 254 during the lifespan of the cable.

Because each site 246-252 of the network may include the components described herein, each of the fibers of the cables 254-260 connecting the sites may be tested or monitored for changes in the intensity of received signals. For example, as described above cable 254 may include fibers that transmit data from site A 246 to site C 250 and from site C to site A. Thus, in addition to measuring received light signals from site A 246, site C 250 may generate a light signal to transmit along cable 254 to site A 246. The switch 212 of site A 246 may similarly receive the transmitted light signals from site C 250 and measure the intensity of the received light signal to determine a drop in the light intensity. Also, site A 246 may provide a monitoring signal along fibers of cable 256 to site B 248 that are measured at switch 222. In this manner, each site 246-252 may provide monitoring signals to each other connected site and measure received monitoring signals from the other sites such that each fiber of the outside plant fiber cables 254-260 are continually monitored by the system 200 of FIG. 2.

Although the switch at each site 246-252 may measure the intensity of the received light signals, the switch may or may not include logic to perform a monitoring function of the signal over time. Thus, in some embodiments, one or more of the switches of the sites 246-252 may connect to or otherwise be in communication with a monitoring device 204 through a network 202. In other words, the switches 212, 228 may provide light intensity measurements of received light signals to the monitoring device 204 through the network 202. In still other embodiments, each switch may have a corresponding monitoring device 204 for monitoring the measured light intensities. The monitoring devices may report alarms or other determinations to a centralized monitoring station or administrator as desired by the network facilitators. Also, the switches 212 may, in some instances, be configured to automatically provide the measured light intensities to the monitoring device 204. In other instances, the monitoring device 204 may log into or otherwise communicate with the switches 212 to obtain the measured intensities, either in a continuous manner or periodically to obtain the measurements. As explained in more detail below, the monitoring device 204 or centralized monitoring station may receive or generate alarms when the measured performance of the fibers of the cables 254-260 is determined to be compromised or underperforming.

Figure 3:
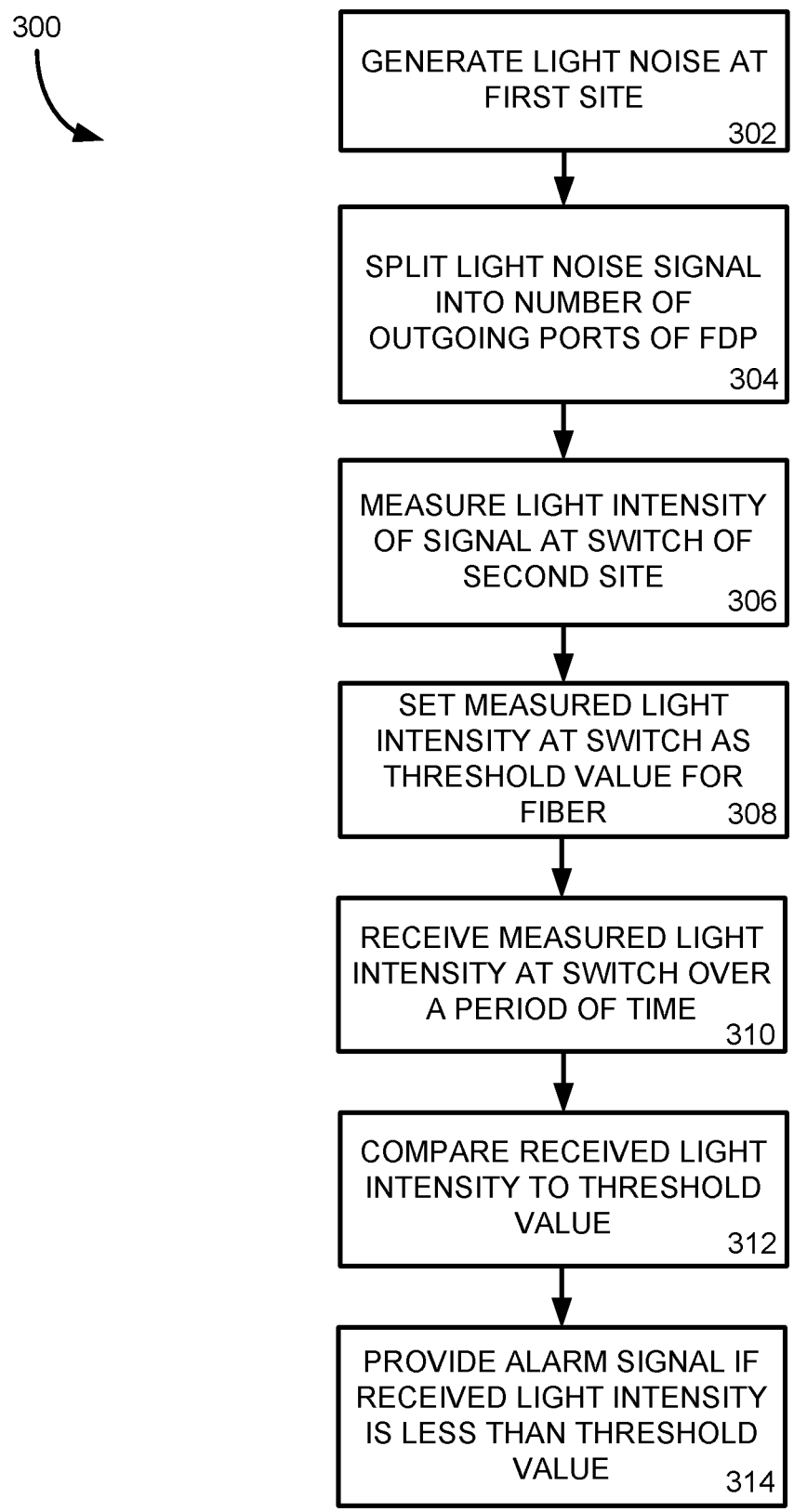
FIG. 3 is a flowchart illustrating a method for monitoring the health or capabilities of an outside plant fiber cable of a telecommunications network.

In particular, FIG. 3 is a flowchart illustrating a method 300 for monitoring the health or capabilities of an outside plant fiber cable of a telecommunications network. The operations of the method 300 may be performed by any component of the telecommunications network, including the monitoring device 204, amplifiers 206, and optical switches 212 of the sites of the network discussed above. Through the operations, the system 200 may provide a baseline or threshold intensity value for received light signals from which the system may determine if a reduction of the intensity is detected, thereby prompting a performance alarm for one or more of the fibers of the network.

Beginning in operation 302, a monitoring light signal is generated at a first site 246 of the telecommunications network. In one embodiment, the monitoring light signal is an amplified C-band light noise signal. For example, the monitoring light signal may have an intensity of at least 3 dBm, although the intensity of the light signal may be any intensity as desired by a tester or monitor of the network. Further, in operation 304, the generated monitoring signal may be split into any number of less intense monitoring signals through a splitter device 210 of the site 246. The number of signals the amplified light signal is split into may be determined by a number of outgoing fiber ports from the site 246 to a second telecommunications site 250 or may be based on a number of ports of a FDP device associated with the site. The split monitoring signals may then be transmitted to the FDP and placed on one more fiber optic cables connected to the FDP at the first network site 246. In one example, a portion of the fibers of the cables 254 may be outgoing transmission fibers to other sites 250 of the network such that the monitoring signals are transmitted along the cable fibers to the other sites of the network. In other implementations, other light noise signals may be used such as, without limitation, an L-band light noise signal. In still other implementations, the light noise signal may include multiple bands, such as a light noise signal including each of C-band and L-band light noise.

In operation 306, a switch device at a second site of the telecommunications network receives the light transmitted from the first site through the outside plant fiber cable and measures a received intensity of the received light. Although the switch device 228 may receive signals from several fibers of many connected fiber optic cables and transmit signals on the fiber optic cables, the switch may measure the received intensity from the signals received at the switch from the connected fibers. The transmission of the amplified light signal from the first site 246 to the switch 228 of the second site 250 may occur, in one embodiment, when the connecting cable 254 is installed or laid between the sites. Thus, upon the installation of the cable 254 between the sites, technicians may transmit the test light signal through the fibers of the cable to the second site 250 to test the success of the installation. In one implementation, the testing of the fibers of the cable 254 may occur in both directions upon installation (from site A 246 to site C 250 and from site C to site A). In other implementations, the direction of transmission of the fibers of the cable 254 may be known upon installation such that the fibers are tested in the direction of transmission for each fiber.

As mentioned above, the switch 228 at the second site 250 measures a received intensity of the test light signal generated from the first site 246. In operation 308, the system 200 may set or establish the measured intensity of the received light signal as the baseline or threshold value for monitoring the operation of the fiber associated with the received signal. For example, upon installation the light signal is generated from the amplifiers 206, 208 and the splitter 210 at the first site 246. Upon transmission through the switch 212 and FDP 214, a light signal for one or more of the fibers of the cable 254 is sent to the second site 250. The FDP 226 of the second site 250 sends the received signals to the switch 228 of the second site that measures the received intensity. In one example, the light signal may be generated to have an intensity of at least 3 dBm and measured at the receiving switch 228 at −12 dBm, although any intensity of the received light may be measured. In some instances, the received measurement may indicate that damage to the fiber has occurred during installation and the fiber may be replaced. However, if the received intensity passes a particular lower threshold that indicates a successful installation, the system 200 may set the received intensity as a baseline or threshold value for operation. For example, the switch 228 may provide the measured intensity to the monitoring device 204 through the network 202 for each received signal. This measurement may be automatically sent by the switch 228 or requested by the monitoring device 204. In other implementations, the switch 228 itself may incorporate aspects of the monitoring device 204 or the monitoring device may be connected directly to the switch to receive the measured intensity of the received light signals.

Regardless of how the measurements are provided to the monitoring device 204 or how the monitoring device is connected to or communicates with the switch 228, the switch provides both a measurement and an identification of the measured fiber of the cable 254. For example, not every fiber of the cable 254 may transmit a light signal with the same attenuation in the signal. Rather, each fiber may have its own corresponding attenuation of light transmitted through the fiber. Thus, each fiber received at the FDP 226 may be identified through a port number that corresponds to a port number of the light switch 228. When the switch provides a measured intensity of a received light signal to the monitoring device 204, the switch may also coordinate and provide a port number with the measured intensity. The monitoring device 204, in turn, may be provided with network configuration information to associate a port number of the switch 228 with a particular fiber path through the cable 254. In this manner, the monitoring device 204 may determine a measured intensity for each of the fibers in the cable 254.

Through the received measured intensity associated with one or more of the fibers of the cable 254, the monitoring device 204 may create a baseline intensity value that represents an operational and functioning fiber in the cable 254. Further, each switch in the network 200 connected to a fiber optic cable may also provide baseline measurements to the monitoring device 204. In this manner, every fiber in the outside plant fiber optic cables of the network may be associated with a baseline or threshold intensity measurement or value, regardless of the direction of transmission for the fiber. In other words, switch 238 may provide baseline values for fibers terminating at site D 252, switch 222 may provide baseline values for fibers terminating at site B 248, and switch 212 may provide baseline values for fibers terminating at site A 246, regardless of which site is the originating site for the light signals carried by the cables 254-260. The baseline or threshold values may be stored by the monitoring device in a storage media for later us in comparison a received measurement to the baseline values.

Once stored, the monitoring device 204 may receive measured light intensities over time in operation 310. In other words, the amplifiers 206, 208 and splitter 210 may continue providing a light signal on the cable 254 from site A 246 for an extended period of time that is measured by the switch 228 at site C 250. In one implementation, the light signal may be transmitted along the fibers of the cable 254 until the fiber is commissioned by the network to carry live traffic. Further, the switch 228 may take periodic or continual measurements of the intensity of the received light signals and provide the measurements (and an indication of the port or fiber associated with the measurement) to the monitoring device 204. The measurements may be automatically transmitted to the monitoring device (sometimes through the network 102) or may be transmitted upon a request for the information from the monitoring device or from a network administrator. In this manner, the system 200 provides a test signal through the fibers of the outside plant fiber cables 254-260 continually that is measured and provided to a monitoring device.

In operation 312, the monitoring device 204 compares the received light signals for the fibers of the outside plant fiber cables 254-260 to the baseline or threshold value stored by the monitoring device. In operation 314, the monitoring device 204 may provide some indication, such as an alarm or notice of some kind, to a network operator when the measured intensity received from the switch 228 falls below the threshold or baseline value. Such a drop in intensity may indicate that the related fiber or cable has been damaged in some manner while out in the field between the sites 246, 250. When an alarm is provided, the network administrator may initiate a ticket to investigate the cause of the drop in measured intensity and remedy the determined damage to the fiber cable 254. In this manner, a continuous, real-time monitoring of the outside plant fiber optic cables 254-260 may be initiated within the telecommunications network to detect damage to the cables prior to commissioning traffic on the fiber cables. By detecting the damage to the fibers upon the occurrence of the damage, the delay in commissioning traffic on the cable due to damage may be minimized, thereby improving the efficiency and operation of the telecommunications network.

As should be appreciated, a network administrator may adjust many facets of the fiber monitoring system 200 as desired. For example, the monitoring device 204 may provide the received intensity measurements to a computing device associated with the network administrator. The computing device may track the measurements over time and provide various statistics on the received measurements. For example, the computing device may calculate a minimum measured intensity, a maximum measured intensity, and an average intensity for a defined period of time. Further, these statistics may be calculated for individual fibers, multiple fibers within a buffer tube, multiple fibers within a cable, or for all fibers in the network. This information may aid the network administrator in determining the general health and operability of the outside plant fiber optic cables of the network.

In addition, the monitoring device 204 may be configured to apply a tolerance to the measured intensity when compared to the baseline value before providing an alarm signal. For example, the intensity of the received light for a particular fiber may fall below the threshold value, but only by a small amount (such as 0.01 dBm). Thus, rather than providing an alarm to the network administrator (or the computing device of the network administrator) when the measured intensity falls below the stored baseline value, an alarm signal may be triggered when the intensity falls a particular value below the baseline, such as 0.5 dBm below the baseline value. The tolerance value may be any value as determined by the system 200, sometimes provided by the network administrator to the monitoring device 204. In other implementations, the monitoring device 204 may simply add the tolerance value into the baseline value when storing in the storage media. The use of the tolerance value may prevent the monitoring device may issuing many alarms for small fluctuations on the associated fiber.

In a similar manner, the monitoring device 204 or computing device of the network administrator may be configured to determine a length of time over which the measured intensity is below the baseline or threshold value before issuing an alarm. Short dips in the measured intensity below the threshold value may not trigger an alarm signal, while sustained measurements below the threshold may trigger an alarm. In one implementation, the length of time for triggering an alarm may be 5 seconds.

Through the computing device receiving the measurements from the monitoring device 204, a network administrator may perform one or more maintenance procedures on one or more of the outside plant fiber optic cables 254-260. For example, a complete loss of light signals on all fibers from a particular cable 254 (detected at the first site 246 and the second site 250 that share the cable in transmission in either direction) may indicate that the cable was severed and a particular remedy may be initiated. A loss at one fiber of a cable may indicate a small cut or jarring of the cable occurred and only one fiber was damaged. In this case, the particularly damaged fiber may be taken out of service while the other fibers may remain available to carry traffic, as long as those fibers retain their intensity measurements at or near the baseline levels. In another case, a small but sustained dip in the intensity in one or more fibers measured by the monitoring device may indicate that a potential security breach has occurred on the fiber. The network administrator may then initiate a proper investigation to the cause of the loss of intensity of the affected fibers. In general, the network administrator or computing device may initiate any type of remedy in response to the received light signal intensity from the monitoring device 204.

Through the systems and methods described above, a telecommunications network may monitor and report on a measured performance or "health" of one or more fiber optic connections between sites of the network. In particular, every fiber of every outside plant fiber optic cable of a telecommunications network may be monitored continually through the systems and methods. Further, this real-time monitoring of the fibers of the network may be obtained, regardless of if the fibers are carrying transmissions or live traffic. Detected problems or breakages within the fiber cables may then be remedied prior to providing traffic on the fibers, thereby improving the commissioning of traffic on the fiber cables.

Figure 4:
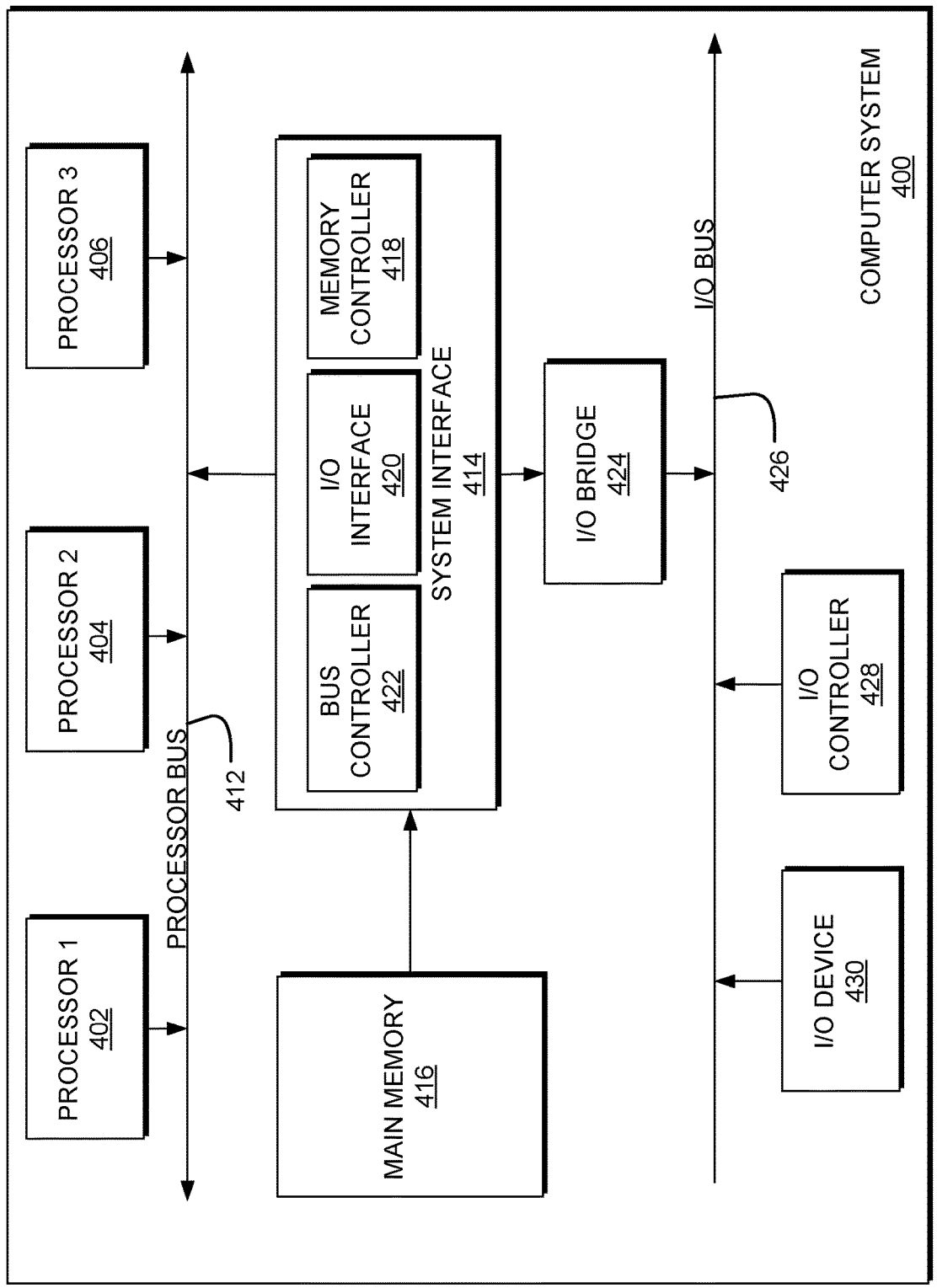
FIG. 4 is a diagram illustrating an example of a computing system which may be used in implementing embodiments of the present disclosure.

FIG. 4 is a block diagram illustrating an example of a computing device or computer system 400 which may be used in implementing the embodiments of the components of the system disclosed above. For example, the computing system 400 of FIG. 4 may be the monitoring device 204 of the system 200 discussed above. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 418 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated. The system interface 414 may further include a bus controller 422 to interact with processor bus 412 and/or I/O bus 426.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

We claim:

1. A method of monitoring a fiber optic cable comprising:
    receiving, at a first optical switch, a plurality of light noise signals from two or more optical switches, wherein the two or more optical switches are geographically disparate, and wherein a first light noise signal is received from a second optical switch and a second light noise signal is received from a third optical switch;
    measuring, using the optical switch, a first intensity of the first light noise signal and a second intensity of the second light noise signal;
    comparing, using a monitoring system communicatively coupled to the optical switch, the first intensity of the first light noise signal received from the second optical switch to a stored threshold intensity value;
    comparing, using a monitoring system communicatively coupled to the optical switch, the second intensity of the second light noise signal to the stored threshold intensity value;

determining, using the monitoring system, that the first intensity of first light noise signal is below the stored threshold intensity value for a length of time that exceeds a threshold value;
generating the plurality of light noise signals using a light signal generator;
wherein generating the plurality of light noise signals comprises:
generating an amplified light noise signal; and
outputting the amplified light noise signal to an optical splitter,
wherein the optical splitter splits the amplified light noise signal into the plurality of light noise signals and transmits the plurality of light noise signals on the fiber optic cable.

2. The method of claim 1, wherein generating the amplified light noise signal further comprises:
outputting a light noise signal from a first amplifier;
receiving the light noise signal at a second amplifier; and
amplifying the light noise signal, using the second amplifier, to generate the amplified light noise signal.

3. The method of claim 2, wherein the light noise signal includes at least of C-band light noise or L-band light noise signal.

4. The method of claim 3, wherein the light noise signal is a C-band light noise signal generated to be at least 3 decibels measured referenced to one milliwatt (dBm).

5. The method of claim 1, wherein the stored threshold intensity value is based on a previous intensity measurement obtained by receiving a plurality of previous light noise signals over the fiber optic cable at the optical switch coupled to the fiber optic cable and measuring, using the optical switch, a previous intensity of at least one of the plurality of previous light noise signals.

6. The method of claim 1 further comprising:
responsive to determining that the length of time exceeds the threshold value, transmitting a signal to a remote computing device indicating that the intensity exceeds the threshold value.

7. The method of claim 1, further comprising transmitting, from the optical switch, the intensity of the at least one of the plurality of light noise signals and a port identification associated with a fiber optic cable of an outside plant fiber optic cable on which the at least one of the plurality of light noise signals is transmitted to the monitoring system.

8. A system for monitoring a fiber optic cable, the system comprising:
a first optical switch located at a first site of a telecommunications network configured to receive a plurality of light noise signals transmitted from two or more optical switches, wherein a first light noise signal of the plurality of light noise signals is received from a second optical switch located at a second site of the telecommunications network, and wherein a second light noise signal of the plurality of light noise signals is received from a third optical switch located at a third site of telecommunications network, and to obtain a first intensity measurement of the first light noise signal and a second intensity measurement of the second light noise signal;
a monitoring system configured to:
receive the first intensity measurement of the first light noise signal;
receive the second intensity measurement of the second light noise signal;
compare the first intensity measurement of the first light noise signal to a stored threshold intensity value;
compare the second intensity measurement of the second light noise signal to the stored threshold intensity value;
determine that the first intensity measurement of the first light noise signal is below the stored threshold intensity value for a length of time that exceeds a threshold value; and
a light signal generator;
wherein the light signal generator comprises:
a first amplifier configured to output a light noise signal;
a second amplifier configured to receive the light noise signal and to output an amplified light noise signal; and
an optical splitter configured to receive the amplified light noise signal and to output the plurality of light noise signals.

9. The system of claim 8 further comprising a second optical switch located at the second site configured to receive a light noise signal transmitted on the outside plant fiber optic cable from the first site of the telecommunications network and to obtain a second intensity measurement of the light noise signal from the first site of the telecommunications network.

10. The system of claim 8, wherein the monitoring system is configured to transmit each of a request to the first optical switch for the intensity measurement and a port identification associated with the fiber optic cable to the monitoring system.

11. The system of claim 8, wherein the monitoring system is further configured to, responsive to determining that the length of time exceeds the threshold value, transmit a signal to a remote computing device indicating that the intensity measurement of the at least one of the plurality of light noise signals exceeds the threshold value.

12. A system for monitoring a cable, the system comprising:
a light signal generator located at a first site of a telecommunications network, the light signal generator configured to output a plurality of light noise signals, from a first optical switch at the first site, to a second site and a third site, wherein the first site, the second site and the third site are geographically disparate, wherein a first light noise signal is transmitted on an outside plant fiber optic cable to the second site of the telecommunications network, and wherein a second light noise signal is sent to a third optical switch located at a third site of telecommunications network, the light signal generator comprising:
an amplifier circuit configured to output an amplified light noise signal; and
an optical splitter configured to receive the amplified light noise signal and to output the plurality of light noise signals;
a second optical switch located at the second site of the telecommunications network configured to receive at the first light noise signal from the first optical switch and receive a fourth light noise signal from the third optical switch, and measure a first intensity of the first light noise signal and a second intensity of the fourth light noise signal; and
a monitoring system configured to:
receive, from the second optical switch, the first intensity measurement of the first light noise signal;
receive, from the third optical switch, the second intensity of the fourth light noise signal;
compare the first intensity measurement of first light noise signal to a stored threshold intensity value;

compare the second intensity measurement of fourth light noise signals to the stored threshold intensity value; and determine that the first intensity measurement of the first light noise signal is below the stored threshold intensity value for a length of time that exceeds a threshold value.

13. The system of claim 12, wherein the amplifier circuit comprises:

a first amplifier configured to output a light noise signal; and a second amplifier configured to receive the light noise signal and to output an amplified light noise signal.

14. The system of claim 13, wherein the light noise signal includes at least one of C-band light noise or L-band light noise.

15. The system of claim 13, wherein the first amplifier is an amplified spontaneous emission generator.

16. The system of claim 12, wherein the optical splitter is a dense wavelength division multiplexing splitter.

* * * * *